United States Patent
Delker et al.

(10) Patent No.: US 8,583,091 B1
(45) Date of Patent: Nov. 12, 2013

(54) DYNAMIC LOADING, UNLOADING, AND CACHING OF ALTERNATE COMPLETE INTERFACES

(75) Inventors: Jason R. Delker, Olathe, KS (US); Lars J. Hacking, Kansas City, MO (US); Sei Y. Ng, Olathe, KS (US); Jeffrey M. Stone, Overland Park, KS (US); Peter S. Syromiatnikov, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/876,221

(22) Filed: Sep. 6, 2010

(51) Int. Cl.
*H04L 29/06* (2006.01)

(52) U.S. Cl.
USPC .............. 455/414.3; 455/404.2; 455/456.1

(58) Field of Classification Search
USPC ............................. 455/413.34, 404.2, 456.1
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,622,016 B1 | 9/2003 | Sladek et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,072,653 B1 | 7/2006 | Sladek et al. | |
| 7,073,130 B2 | 7/2006 | Novak et al. | |
| 7,215,754 B1 | 5/2007 | Woodson et al. | |
| 7,260,382 B1 | 8/2007 | Lamb et al. | |
| 7,260,386 B1 | 8/2007 | Haldar et al. | |
| 7,500,198 B2 | 3/2009 | Mathews et al. | |
| 8,244,277 B1 | 8/2012 | Cha et al. | |
| 8,265,658 B2 | 9/2012 | Issa et al. | |
| 8,315,198 B2 | 11/2012 | Corneille et al. | |
| 2002/0029169 A1 | 3/2002 | Oki et al. | |
| 2002/0054086 A1 | 5/2002 | Van Oostenbrugge et al. | |
| 2002/0054150 A1 | 5/2002 | I'Anson et al. | |
| 2002/0101444 A1 | 8/2002 | Novak et al. | |
| 2002/0123335 A1 | 9/2002 | Luna et al. | |
| 2002/0167542 A1 | 11/2002 | Florin | |
| 2003/0233329 A1 | 12/2003 | Laraki et al. | |
| 2004/0044752 A1 | 3/2004 | Hamaguchi et al. | |
| 2004/0179034 A1 | 9/2004 | Burritt | |
| 2004/0181678 A1 | 9/2004 | Lee et al. | |
| 2004/0203941 A1 | 10/2004 | Kaplan et al. | |
| 2004/0216054 A1 | 10/2004 | Mathews et al. | |

(Continued)

OTHER PUBLICATIONS

Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.

(Continued)

*Primary Examiner* — Patrick Edouard
*Assistant Examiner* — Michael Irace

(57) ABSTRACT

A processor-implemented method is provided. The method comprises determining that a portable electronic device is within a coverage area of a local wireless communication network. The method also comprises automatically sending information about accessing the local wireless communication network to a mobile wireless communication network. The method also comprises receiving a request to access the local wireless communication network from the portable electronic device, wherein the request comprises at least some of the information about accessing the local wireless communication network. The method also comprises transmitting an interface pack to the portable electronic device.

14 Claims, 7 Drawing Sheets

(56) References Cited

U.S. PATENT DOCUMENTS

| | | | |
|---|---|---|---|
| 2005/0071780 A1 | 3/2005 | Muller et al. | |
| 2005/0085272 A1 | 4/2005 | Anderson et al. | |
| 2006/0048141 A1 | 3/2006 | Persson et al. | |
| 2006/0085751 A1 | 4/2006 | O'Brien et al. | |
| 2006/0092861 A1* | 5/2006 | Corday et al. | 370/256 |
| 2006/0258289 A1 | 11/2006 | Dua | |
| 2006/0277469 A1 | 12/2006 | Chaudhri et al. | |
| 2007/0067738 A1 | 3/2007 | Flynt et al. | |
| 2007/0265023 A1 | 11/2007 | Bengtsson et al. | |
| 2007/0268842 A1 | 11/2007 | Wang | |
| 2007/0282914 A1* | 12/2007 | Sivapragasam et al. | 707/200 |
| 2008/0034309 A1 | 2/2008 | Louch et al. | |
| 2008/0092057 A1 | 4/2008 | Monson et al. | |
| 2008/0214172 A1 | 9/2008 | Anwer | |
| 2008/0276182 A1* | 11/2008 | Leow | 715/740 |
| 2008/0319887 A1 | 12/2008 | Pizzi et al. | |
| 2009/0017870 A1 | 1/2009 | An | |
| 2009/0077495 A1 | 3/2009 | Bhat et al. | |
| 2009/0181716 A1 | 7/2009 | Benco et al. | |
| 2009/0228824 A1 | 9/2009 | Forstall et al. | |
| 2010/0005196 A1* | 1/2010 | Wolff-Petersen | 710/8 |
| 2010/0080163 A1* | 4/2010 | Krishnamoorthi et al. | 370/312 |
| 2010/0190478 A1 | 7/2010 | Brewer et al. | |
| 2010/0197219 A1* | 8/2010 | Issa et al. | 455/3.06 |
| 2010/0234051 A1 | 9/2010 | Holden et al. | |
| 2010/0281427 A1 | 11/2010 | Ghosh et al. | |
| 2011/0161149 A1 | 6/2011 | Kaplan | |
| 2012/0102547 A1 | 4/2012 | Fransdonk | |

OTHER PUBLICATIONS

Delker, Jason R., et al., Patent Application entitled "Provisioning System and Methods for Interfaceless Phone," filed Sep. 6, 2010, U.S. Appl. No. 12/876,220.

Delker, Jason R., et al., Patent Application entitled "System and Method for ID Platform," filed Feb. 8, 2011, U.S. Appl. No. 13/023,486.

Delker, Jason R., et al., Patent Application entitled "Shared ID with Second Party," filed Jan. 31, 2011, U.S. Appl. No. 13/018,083.

Delker, Jason R., et al., Patent Application entitled "Extending ID to a Computer System," filed May 27, 2011, U.S. Appl. No. 13/118,058.

Davis, John M., et al., Patent Application entitled "Mirroring Device Interface Components for Content Sharing," filed Mar. 10, 2011, U.S. Appl. No. 13/045,292.

Cha, Tae-Woo, et al., Patent Application entitled "Device Experience Adaptation Based on Schedules and Events," filed Feb. 16, 2011, U.S. Appl. No. 13/029,103.

Smith, Nathan A., et al., Patent Application entitled "Restricted Testing Access for Electronic Device," filed Jun. 16, 2011, U.S. Appl. No. 13/161,496.

Delker, Jason R., et al., Patent Application entitled "Ad Sponsored Communication Pack," filed Feb. 18, 2011, U.S. Appl. No. 13/031,123.

Pre-Interview Communication dated Feb. 26, 2013, U.S. Appl. No. 13/023,486, filed Feb. 8, 2011.

Pre-Interview Communication dated Feb. 26, 2013, U.S. Appl. No. 13/118,058, filed May 27, 2011.

Office Action dated Mar. 14, 2013, U.S. Appl. No. 13/161,496, filed Jun. 16, 2011.

Delker, Jason R., et al., Patent Application entitled "Transition Experience During Loading and Updating an Interface and Applications Pack," filed Oct. 24, 2012, U.S. Appl. No. 13/659,889.

First Action Interview Pre-Interview Communication dated Apr. 24, 2012, U.S. Appl. No. 12/876,220, filed Sep. 6, 2010.

Notice of Allowance dated Mar. 30, 2012, U.S. Appl. No. 13/029,103, filed Feb. 16, 2011.

FAIPP Pre-Interview Communication dated Jul. 19, 2012, U.S. Appl. No. 13/018,083, filed Jan. 31, 2011.

Cha, Tae-Woo, et al., Patent Application entitled, "Device Experience Adaptation Based on Schedules and Events," filed Jun. 29, 2012, U.S. Appl. No. 13/537,563.

Annan, Brandon C., et al., Patent Application entitled, "Traffic Management of Third Party Applications", filed Jul. 31, 2012, U.S. Appl. No. 13/536,709.

Ackerman, Samuel K., "Lecture Slides: Mapping User Interface Design to Culture Dimensions", Aaron Marcus and Associates, Inc., 2001.

Kenja's Newsletter, About Newsletter, http://kenja.net/news.main.html, printed from the World Wide Web, "last modified Fri, Oct. 10, 2003".

OPENWAVE, "Comparison of WAP Push and Short Message Service (SMS)," Openwave Systems, Inc., Redwood City, CA, Apr. 2002.

QUALCOMM, uiOne™, http://brew.qualcomm.com/brew/in/about/uione.html, Published Sep. 22, 2005.

SCANSOFT press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.

Stanford Technology Ventures Program, "Danger, Inc.: Powering the Next Generation of Mobile Technology", Oct. 15, 2003.

Office Action dated Apr. 15, 2008, U.S. Appl. No. 11/046,083, filed Jan. 28, 2005.

Final Office Action dated Oct. 28, 2008, U.S. Appl. No. 11/046,083, filed Jan. 28, 2005.

Office Action dated Aug. 15, 2011, U.S. Appl. No. 12/330,759, filed Dec. 9, 2008.

Office Action dated Apr. 3, 2008, U.S. Appl. No. 11/333,964, filed Jan. 17, 2006.

Final Office Action dated Oct. 8, 2008, U.S. Appl. No. 11/333,964, filed Jan. 17, 2006.

Final Office Action dated Jan. 21, 2009, U.S. Appl. No. 11/333,964, filed Jan. 17, 2006.

Advisory Action dated Apr. 13, 2009, U.S. Appl. No. 11/333,964, filed Jan. 17, 2006.

Office Action dated Jun. 23, 2009, U.S. Appl. No. 11/333,964, filed Jan. 17, 2006.

Final Office Action dated May 11, 2010, U.S. Appl. No. 11/333,964, filed Jan. 17, 2006.

Advisory Action dated Jul. 22, 2010, U.S. Appl. No. 11/333,964, filed Jan. 17, 2006.

Wolter, Eric, Patent Application entitled "Method and System for Calendar-Based Delivery of Themed User-Interface Skins," filed Dec. 9, 2008, U.S. Appl. No. 12/330,759.

Wolter, Eric S., Patent Application entitled "Method and System for Delivery of User-Interface Skins, Applications, and Services to Wireless Devices," filed Jan. 17, 2006, U.S. Appl. No. 11/333,964.

Katzer, Robin Dale, et al., Patent Application entitled "Zone Architecture for Dynamic Targeted Content Creation," filed Oct. 11, 2011, U.S. Appl. No. 13/271,207.

Notice of Allowance dated Jun. 4, 2013, U.S. Appl. No. 13/023,486, filed Feb. 8, 2011.

Final Office Action dated May 10, 2013 U.S. Appl. No. 13/018,083, filed Jan. 31, 2011.

First Action Interview Office Action dated May 6, 2013, U.S. Appl. No. 13/118,058, filed May 27, 2011.

Notice of Allowance dated Apr. 29, 2013, U.S. Appl. No. 13/537,563, filed Jun. 29, 2012.

Notice of Allowance dated Jun. 27, 2013, U.S. Appl. No. 13/161,496, filed Jun. 16, 2011.

* cited by examiner

DYNAMIC LOADING, UNLOADING, AND CACHING OF ALTERNATE COMPLETE INTERFACES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An effective user interface for a mobile device may be readily understood and provide the user a sense of comfort and control. Users may see the range of their choices, understand how to accomplish their objectives, and complete their tasks. The user interface may relieve the user from performing trivial tasks. Work done by the device may be continuously saved, with a full option for the user to undo any activity at any time. A well designed user interface may feature applications and services that perform an increased quantity of work, while requiring a reduced quantity of input from the user. Interface applications may attempt to anticipate the wants and needs of the user. The user may be relieved of tasks comprising searching for or gathering information or locating tools. A well designed interface may deliver the information and tools needed for each step of the process to the user. The interface and its applications may speak the users' language, with familiar phrases and words, instead of terms oriented to the system of the device or complicated technology details. Information presented by the interface appears in a natural and logical order. Information that is less relevant or rarely needed may not be presented in dialogue boxes or messages to the user.

SUMMARY

In an embodiment, a processor-implemented method is provided. The method comprises determining that a portable electronic device is within a coverage area of a local wireless communication network. The method also comprises automatically sending information about accessing the local wireless communication network to a mobile wireless communication network. The method also comprises receiving a request to access the local wireless communication network from the portable electronic device, wherein the request comprises at least some of the information about accessing the local wireless communication network. The method also comprises transmitting an interface pack to the portable electronic device.

In an embodiment, a portable electronic device is provided comprising a processor, a memory, and an interface application that, when executed on the portable electronic device, loads a first user application and a second user application on the portable electronic device from a first interface pack downloaded from a first software source. The portable electronic device also unloads and caches the first user application and the second user application. The portable electronic device also loads a third user application and a fourth user application on the portable electronic device from a second interface pack downloaded from a second software source. The portable electronic device also unloads and one of caches and deletes the third user application and the fourth user application from the portable electronic device. The portable electronic device also reloads from cache the first user application and the second user application on the portable electronic device.

In an embodiment, a processor-implemented method is provided comprising a mobile device receiving a first message, the first message indicating the availability of a first interface pack for downloading by the mobile device. The method also comprises the mobile device determining that the first message was sent by a first trusted source, the first trusted source associated with applications provided by the first interface pack. The method also comprises the mobile device determining that it previously received, loaded, and used the applications provided by the first interface pack, that it subsequently cached portions of the first interface pack, and that it deleted the uncached portions of the first interface pack. The method also comprises the mobile device sending a second message to the first trusted source, the second message requesting current versions of the uncached portions of the first interface pack. The method also comprises the mobile device receiving and loading the current versions of the uncached portions of the first interface pack from the first trusted source.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
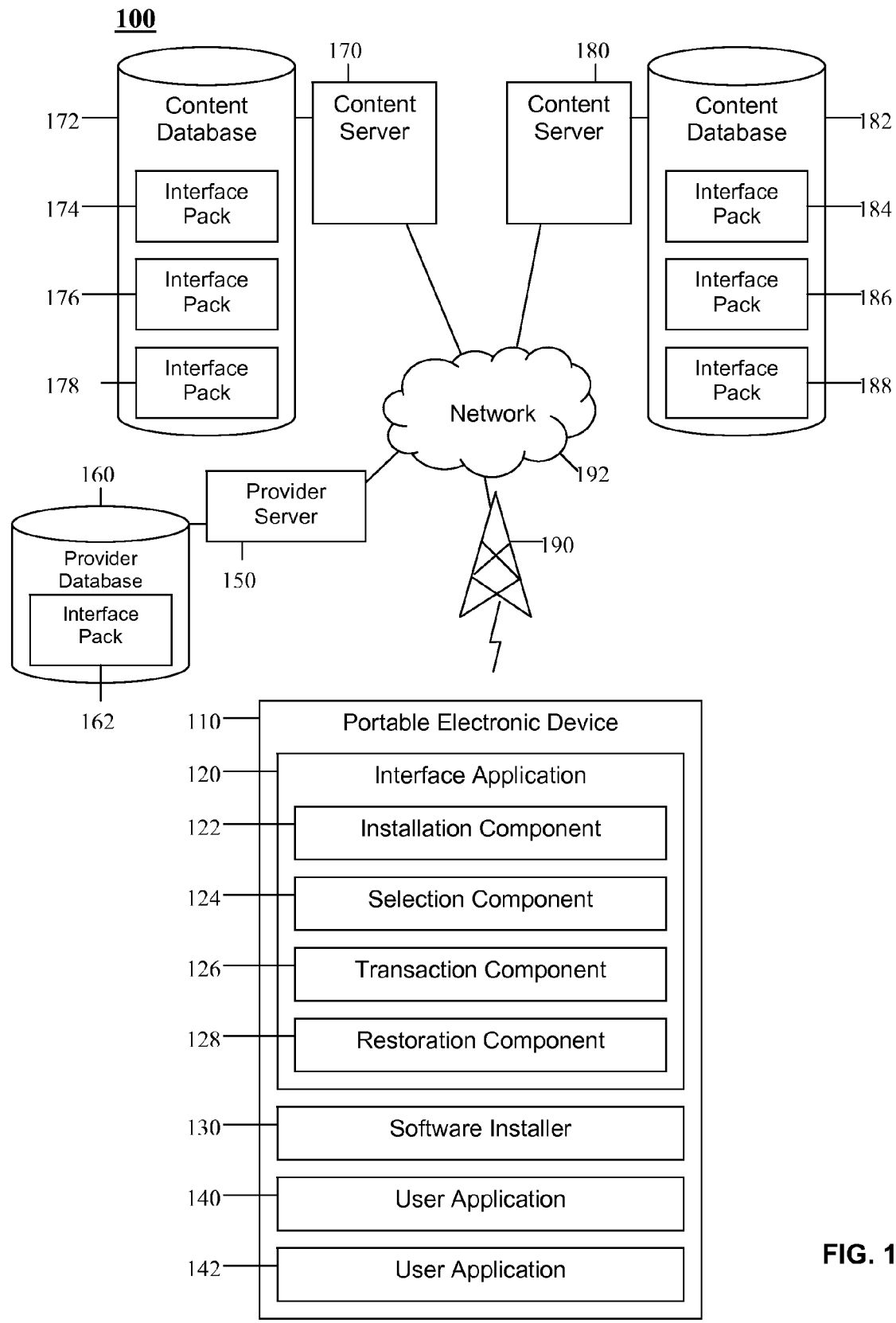
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure provides a system and methods promoting a portable electronic device to load, unload, cache, and reload packaged bundles of applications, content, themes, and/or network applications that comprise at least a portion of a user interface for the device. In an embodiment, the packaged bundles may comprise applications, content, themes, and/or network applications that have been tested and/or precertified to work together. The portable electronic device may receive an input or come in proximity of a venue associated with a content provider. The content provider may detect the proximity of the portable electronic device or detect the entry of an input and may qualify the device and/or its user with a telecommunications services provider providing wireless services to the device. The content provider may make interface packs containing a plurality of user applications, content, network applications and/or additional software available for download by the device. The device may automatically or upon user action download and load an interface pack from a content server associated with the content provider. The user applications loaded on the device comprise the user interface and may provide functionality based on activities associated with the content provider and its venue, for example a retail location. The user applications loaded and executing on the device may remain there during the time the device is within proximity of the venue. Thereafter, the user applications may be unloaded, and a different and perhaps default user interface comprising a different set of user applications may be reloaded on the device.

A telecommunications service provider providing wireless voice and data services also may provide a choice of several sets of user applications, content, and/or network applications to the portable electronic device in downloadable interface packs when the device is new and after it is initially activated for service. The user applications, content, and other software provided in the interface pack may comprise web widgets, tiles, really simple syndication (RSS) feed icons, media players, wallpapers, themes, ring tones, call tones, and listings of internet links that together comprise a full user interface for the device. Installable software components that may access a plurality of network services also may be included. The user applications may be automatically loaded without user intervention by a software installer included in the interface pack using loading routines that have been tested and approved along with the user applications by the telecommunications service provider.

The telecommunications service provider also may promote other content providers, such as commercial enterprises, to provide their own precertified bundles of user applications to qualified portable electronic devices when those devices become proximate to or enter venues associated with the commercial enterprises, when an input is activated on the device, or upon another event. Upon one of such occurrences, the device may exchange transmissions with a content server associated with the content provider, be identified and qualified, and receive an interface pack via WiFi or other wireless transmission. The device may have previously authorized the receipt of interface packs from the content provider or content providers of a predefined type. Upon detecting the proximity of the device to a subject location, the content provider may provide an authorization token to the telecommunications service provider that may determine from its records that the device has previously authorized the receipt of interface packs from the content provider. The telecommunications service provider may provide the authorization token and/or a network identity to the device, and the device may then pass the token and/or the network identity to the content provider. Based on receipt and verification of the authorization token, the content provider then makes the interface packs available to the device for access. The software installer included in the interface packs or already resident on the device activates and loads the user applications contained in the downloaded interface pack. While the device is within proximity of the venue and the user applications are loaded and executing as the user interface, the content provider may provide audible and/or visual content to the device including music, ring tones, advertisements, electronic promotions, and price information. Based on a profile associated with the device and information about previous activities of the device and its user, the content provider may transmit customized information, including promotions, to the device.

User interfaces comprising groups of user applications and additional software downloaded from the telecommunications service provider and various content providers may be interchangeable. The device may unload most or all of a loaded group of user applications, download and temporarily load a different group of user applications, and later reload the first group of user applications with some of the reloaded user applications updated or refreshed with current versions. The device may use a pack of user applications downloaded from the telecommunications service provider as its default user interface and may selectively use other downloaded packs of user applications from various content providers or the telecommunications service provider as it moves about or upon user election. The device may automatically, upon user input, or after verification by the telecommunications service provider and provision of the authorization token, respond to messages received from content providers to download interface packs and exchange one user interface for another user interface. The messages may initially request or cause the device to activate functionality that permits the device to communicate with the content server associated with the content provider. The device may then download the interface pack from the content provider and load the user applications, and the user may enjoy the user experience provided by the interface until exiting the provider's venue or upon the user's decision to exchange the user interface for another.

Turning now to FIG. 1, a system 100 of dynamic loading, unloading, and caching of alternate complete interfaces is provided. The system 100 comprises a portable electronic device 110, an interface application 120, a software installer 130, user applications 140, 142, a content server 170, 180, content databases 172, 182, interface packs 174, 176, 178, 184, 186, 188, a base transceiver station 190, and a network 192.

The interface application 120 executes on the portable electronic device 110. Portable electronic devices 110 are described in detail hereinafter. The interface application 120 has contact with a plurality of content servers 170, 180 and downloads interface packs 174, 176, 178, 184, 186, 188 containing user applications 140, 142. When loaded on the portable electronic device 110, the user applications 140, 142 become the user interface or user experience for the portable electronic device 110. Each one of the interface packs 174, 176, 178, 184, 186, 188 provides a complete user interface. For example, one interface pack 174 may provide user applications 140, 142 that comprise the complete user interface. The user interface created by the loaded user applications 140, 142 may be permanent or may be temporary. The user interface created from one of the interface packs 174, 176, 178 from one content server 170 may be replaced by a user interface created from another of the interface packs 174, 176, 178 from the same content server 170. The user interface created from one of the interface packs 174, 176, 178 from one content server 170 may alternatively be replaced by a user interface created from one of the interface packs 184, 186, 188 from a different content server 180 and vice versa.

Complete interfaces for the portable electronic device 110 comprise the full user experience and may comprise user applications 140, 142 that execute in the viewing area of the portable electronic device 110. The complete interface also may comprise user applications 140, 142 that are executing but are "in the background" and not visible to the user. The interface may include software items that are accessing services across networks, for example call tones that may be in effect while a user interface associated with a particular retailer, for example, is loaded and executing. Wallpaper, or the background of a graphical user interface or display, may be part of the user interface. The complete interface also may comprise web widgets and links to internet sites that may constantly or intermittently access internet sites. Ring tones and other sounds that may be downloadable in the interface pack 174 and loadable on the portable electronic device 110 also may be components of the complete interface.

While interface pack 174 is discussed hereinafter, it is understood that one of the other interface packs 176, 178, 184, 186, 188 alternatively may be used in substantially the same manner as the interface pack 174. The interface pack 174 available for download from content servers 170, 180 may contain user applications 140, 142 that are precertified by a telecommunications service provider and may load automatically on the portable electronic device 110 using tested routines. Other interface packs 176, 178, 184, 186, 188 may contain other user applications and/or combinations of user interface items such as widgets, tiles, ring tones, wallpaper, access to network services, and other user interface items. The telecommunications service provider may provide wireless voice and data services to the portable electronic device 110. The telecommunications service provider may be associated with a provider server 150 and a provider database 160 and may have provided user applications 140, 142 for the loading of the initial user interface after the portable electronic device 110 was activated upon purchase. The content servers 170, 180 may be associated with entities separate from the telecommunications service provider. The telecommunications service provider may arrange with the operators of the content servers 170, 180 to build customized interface packs 174, 176, 178, 184, 186, 188 containing user applications 140, 142 and/or widgets, tiles, ring tones, wallpaper, and other user interface components available for download. The other components may comprise software loaded on the portable electronic device 110 that may access network services from providers located across networks. While network services may not comprise a user application 140 per se, network services are items of value, access to which may be available through the interface pack 162. Network services may be acquired through the interface pack 162 on a subscription basis from a services provider, for example, that may operate the content server 170.

Network services also may comprise applications and/or functionality provided by the network, for example the service provider network communications infrastructure, rather than by the portable electronic device 110 that may be related to the communications experience of the portable electronic device 110. For example, a call tone which is played back to a calling party originating a voice call to the portable electronic device 110 may be determined by network services. A different call tone may be defined for the portable electronic device 110 depending upon what interface pack 162 is currently active and/or loaded for the portable electronic device 110. Loading of the user application 140 that may include access to network services may comprise loading software components on the portable electronic device 110 that periodically generate transmissions to external providers of services and request information, messages, news, or other items that may be periodically refreshed by the external provider. These software components may differ from widgets or internet links that may be also be periodically accessed.

The user applications 140, 142 may be specific to the business interests and operations of the content servers 170, 180. The interface packs 174, 184 providing the user applications 140, 142 may be downloadable and usable when the portable electronic device 110 is in the proximity of physical venues associated with the content servers 170, 180 or conditionally upon other factors or events, such as the portable electronic device 110 receiving a user input. The telecommunications service provider may precertify the user applications 140, 142 of the operators of the content servers 170, 180 and may precertify the software routines written to promote automated loading of their user applications 140, 142. By precertifying the user applications 140, 142 and their loading routines of a plurality of operators of content servers 170, 180, the telecommunications service provider may facilitate the portable electronic device 110 to exchange user interfaces when entering a plurality of physical venues associated with the content servers 170, 180.

The content servers 170, 180 may be associated with content providers, for example enterprises, businesses, or other entities, that may wish to provide a customized bundle or package of trusted user applications 140, 142 that may comprise the user interface for the portable electronic device 110. A set of user applications 140, 142 provided in a downloadable interface pack 174 from the content servers 170, 180, respectively, comprises the full user interface after loading. The interface packs 174, 184, for example, may be downloadable from the content servers 170, 180 when the portable electronic device 110 physically enters a venue associated with the operators of the content servers 170, 180, upon the user of the portable electronic device 110 activating an input, or upon another event. When the user applications 140, 142 are loaded on the portable electronic device 110 providing the specialized user interface, the content server 170, through WiFi communication with the portable electronic device 110, may engage in customized interaction with the portable electronic device 110. This customized interaction may last while the portable electronic device 110 is in the physical proximity of the venue. The interaction may end when the portable electronic device 110 exits the venue and its proximity whereupon the user applications 140, 142 may be unloaded and a default or different set of user applications 140, 142 may automatically load or reload on the portable electronic device 110. While the portable electronic device 110 is in the proximity of the venue that, for example, may be a retail store, the content server 170 may stream music or other media to the portable electronic device 110 containing advertisements and announcements of promotions, may provide store floor plan maps, and may provide electronic coupons and product and pricing information.

The portable electronic device 110 may use network services, such as call tones, that are obtained and refreshed from providers across a network, for example the content server 170 of the retail store. While the portable electronic device 110 is in the retail store, for example, when a caller seeks to originate a voice call to the portable electronic device 110, a call tone is played back to the caller that indicates that the user is presently shopping at the retail store and urges callers to ask the user about the merchandise or services the user is viewing and learning about in the retail store. The user of the portable electronic device 110 may be provided an electronic coupon for items on sale at the retail store for agreeing to use the call tone with the advertising theme. The media provided by the content server 170 may be further customized based on profile information associated with the portable electronic device 110 and/or its user, for example information about previous visits to the retail store and products purchased and economic, demographic, and personal information about the user.

The telecommunications service provider may provide the initial user interface for the portable electronic device 110 in one of a plurality of downloadable interface packs 162. The interface packs 162 may be stored in the provider database 160 accessible by the provider server 150 associated with the telecommunications service provider. When the portable electronic device 110 is powered on for the first time, it may self-activate its account with the telecommunications service provider and reboot. After powering back on, the portable electronic device 110 may present an option to one of dial 911, the emergency telephone number for the North American Numbering Plan (NANP), and download an interface pack 162 containing user applications 140, 142 that, when uncompressed and loaded, become the user interface for the portable electronic device 110. A software installer 130 and style guide are included in the interface pack 162. The software installer 130 uncompresses and loads the user applications 140, 142 provided by the interface pack 162 selected using an automated loading routine involving little or no user action. The software installer 130 remains installed on the portable electronic device 110 and later may be used when subsequent interface packs 162 are downloaded from the provider server 150 or when other interface packs 174, 176, 178, 184, 186, 188 are downloaded from the content servers 170, 180. The process of downloading interface pack 162 and/or interface pack 174 from the provider server 150 and the content servers 170, 180, respectively, and the using of automated routines by the software installer 130 to load user applications 140, 142 that become the initial and subsequent user interfaces for the portable electronic device 110 may be sponsored by the telecommunications service provider. The telecommunications service provider may facilitate, in the interest of furthering business relationships, content providers that are business enterprises and other types of entities to develop user applications 140, 142 and automated loading routines that the telecommunications service provider may test and precertify that may be packaged into interface packs 174, 176, 178, 184, 186, 188 that may be downloadable by the portable electronic device 110 from the content servers 170, 180. For further details about the viewing, selection, downloading, and loading of the initial interface pack 162 and component user applications 140, 142 and about the interchangeability of user interfaces, see U.S. patent application Ser. No. 12/876,220, filed Sep. 6, 2010, entitled "Provisioning System and Methods for Interfaceless Phone" by Jason R. Delker, et al., which is herein incorporated by reference.

User applications 140, 142 comprise a plurality of application types that together comprise the interface or user experience for the portable electronic device 110. The user applications 140, 142 may comprise web widgets, tiles, really simple syndication (RSS) feed icons, media players, wallpapers, ring tones, and listings of links. While some of these items, for example wallpapers, may not be applications, the term user applications 140, 142 is meant herein to comprise applications and other software items that together comprise the full user interface as described herein. User applications 140, 142 also comprise access to network services that may comprise access to periodically changing content that is changed by providers across networks, for example call tones. Network services also may comprise, for example, the taking delivery of content from a provider across a network and displaying the content in the banner of the portable electronic device 110. Network services also may comprise receiving and displaying regular messages or announcements from external sources. Each interface pack 162, 174, 176, 178, 184, 186, 188 may contain a unique combination of different user applications 140, 142. A single interface pack 162, 174, 176, 178, 184, 186, 188 may comprise a complete user interface. Interface packs 162, 174, 184 may combine, package, or bundle user applications 140, 142 by subject type, motif, or unifying idea. Interface packs 174, 184 provided by the content servers 170, 180 may provide user applications 140, 142 that are directed to the business activities or interests of the content provider, for example an operator of retail stores, associated with the content servers 170, 180.

The portable electronic device 110 may be one of a mobile telephone, a media player, and a personal digital assistant (PDA). In addition to having a radio transceiver to exchange transmissions with the base transceiver station 190 for wireless voice and data communications, the portable electronic device 110 also may contain hardware and software providing WiFi functionality that may be used in connection with the portable electronic device 110 visiting commercial and other venues as described above. The portable electronic device 110, alternatively or in addition to WiFi technology, may contain other hardware and software associated with other wireless local area network technologies that may observe the IEEE (Institute of Electrical and Electronics Engineers) 802.11 set of standards.

In a first example, a first content provider may be a retailer of consumer products and may be associated with the content server 170. When the portable electronic device 110, through its signal beaconing or other method, is detected to enter the proximity of a retail store associated with the first content provider, the first content provider may detect the presence of the portable electronic device 110 and seek to cause the portable electronic device 110 to load a user interface associated with the first content provider. The content server 170 may determine through signaling generated by the portable electronic device 110 that the portable electronic device 110 has a subscription arrangement for wireless services with a first telecommunications services provider. The content server 170 may send an authorization token or other object providing authorized access to the first telecommunications services provider and may request the first telecommunications services provider to determine if the portable electronic device 110 has previously authorized or otherwise indicated receptivity to loading a user interface provided by the content server 170. In an embodiment, the user of the portable electronic device 110 may have indicated that the portable electronic device 110 will load user interfaces from some predetermined content providers, for example retailers, while the user interfaces provided by other content providers are not to be loaded. This also may comprise providing permission to activate the WiFi transceiver of the portable electronic device 110 if it is not activated at the time that the portable electronic device 110 comes into the proximity of a content provider that the user has approved.

Continuing with the first example, the first telecommunications services provider receives the authorization token from the content server 170 and processes the request from the content server 170 to determine if the portable electronic device 110 has previously authorized receiving the user interface from the content server 170. Receiving the user interface comprises downloading, uncompressing, and loading at least one interface pack 174 from the content server 170. If the first telecommunications services provider determines from its records that the portable electronic device 110 authorized receiving the user interface from the content server 170, the telecommunications services provider passes the authorization token provided earlier by the content server 170 in its request to the portable electronic device 110. The portable electronic device 110 passes the authorization token to the content server 170. The content server 170 may examine the authorization token to verify that it is the authorization token it sent earlier to the telecommunications services provider. Upon verification, the content server 170 may send signaling to the portable electronic device 110 requesting it to activate its WiFi transceiver so it may then download the interface pack 174 from the content server and load the user applications 140, 142 contained therein. In an embodiment, the portable electronic device 110 may activate its WiFi transceiver upon receiving the authorization token from the telecommunications services provider and not wait for instruction from the content server 170. After activating its WiFi transceiver, the portable electronic device 110 may establish a session with the content server 170, view a description of the interface packs 174, 176, 178 available on the content server 170, and download one interface pack 174, 176, 178. The content server 170 may examine a profile provided by the portable electronic device 110 or another component that the content server 170 may use to qualify the portable electronic device 110 for receipt of an interface pack 174. The content server 170 also may apply at least one policy to the portable electronic device 110 to further qualify the portable electronic device 110. Policies may be based on a service plan the portable electronic device 110 may have with the telecommunications service provider. The profiles and policies may be used to filter out some interface packs 174, 176, 178 that may not be appropriate for some portable electronic devices 110 or their users. A profile, for example, might contain parental controls that limit the type of user applications 140, 142 that might be made available in a user interface for an underage user. The profile and policies also may be used to provide the portable electronic device 110 with some items of value specific to the user of the portable electronic device 110, for example electronic coupons.

Once qualified and the eligible interface packs 174, 176, 178 have been determined, the portable electronic device 110 selects an interface pack 174 that is downloaded and its component user applications 140, 142 are loaded on the portable electronic device 110 and may remain loaded while the portable electronic device 110 is in the predetermined proximity of the retail store. When the user applications 140, 142 are loaded, they may replace user applications 140, 142 loaded from a different interface pack 162, 176, 178, 184, 186, 188 downloaded earlier from the provider server 150 or downloaded from the same or a different content server 170, 180. The unloaded user applications 140, 142 may be either deleted or partially or totally cached. If the user of the portable electronic device 110 intends to use the unloaded user interface again, the interface application 120 may cache the entirety or a portion of the unloaded user applications 140, 142 on the portable electronic device 110 or in a remote storage device. In an embodiment, the portions of the unloaded user applications 140, 142 may comprise authorizations secured for using the unloaded user applications 140, 142 and template files used for rendering them. It may not be feasible to cache the other portions of the unloaded user applications 140, 142 because these portions may be cumbersome to store and also may comprise volatile and periodically updated information. The present disclosure teaches the reloading of unloaded and cached user applications 140, 142. In an embodiment, the portable electronic device 110 may display a default user interface comprising user applications 140, 142 downloaded from the provider server 150 that may be associated with the telecommunications service provider. The portable electronic device 110 may use the default user interface except during times when it is in the proximity of predetermined retail venues designated and authorized by the user of the portable electronic device 110. When the portable electronic device 110 is moved outside the proximity of those retail venues, the user interface comprising user applications 140, 142 downloaded from the content servers 170, 180 associated with those venues is unloaded and the default user interface that was previously downloaded from the provider server 150 or another component may be reloaded.

The present disclosure teaches the loading and unloading of user applications 140, 142 that may be less comprehensive than the full installation and deletion of the user applications 140, 142. When user applications 140, 142 that presently comprise the user interface are to be replaced by user applications 140, 142, the replaced user applications 140, 142 may be fully or partially cached and saved locally on the portable electronic device 110 or in a remote storage location. While portions of the unloaded user applications 140, 142 may represent volatile or perishable information such as stock market prices, sports scores, or weather information, this information may represent deliverable, consumable content as opposed to application content that generally may not be volatile. While current weather information, for example, may not be saved, the template parameters used to provide the weather information, for example the geographic area of the user and the information the user has chosen to view, may not change. While the initial downloading and loading of the first interface pack 162 from the provider server 150 when the portable electronic device 110 is new may comprise installation of the user applications 140, 142 provided therein, subsequent actions regarding user interfaces may be characterized as loading, unloading, and reloading, as all or portions of the unloaded user applications 140, 142 may be retained for future use. While full deletions of user interfaces comprising user applications 140, 142 may occur in an embodiment, the present disclosure teaches that the entirety or portions of user interfaces that are unloaded may be cached for future use.

Continuing with the first example involving the content server 170 associated with a retailer and its store locations, when the portable electronic device 110 has downloaded the interface pack 174 provided by the content server 170 and loads the user applications 140, 142 comprising the retailer's customized user interface, the content server 170 may engage in specialized communications with the portable electronic device 110. While the portable electronic device 110 is in or near the retail store, the content server 170 may stream music to the portable electronic device 110 that may contain advertisements and announcements of prices, product information, and promotions in the retail store. One of the user applications 140, 142 may be a floor plan map of the retail store with a directory or may be a search engine that the portable electronic device 110 may use to locate merchandise in the retail store, at other physical locations, in online catalogs, or elsewhere. The content server 170 also may examine the profiles of the portable electronic device 110 and/or its user, analyze previous transaction history, and analyze the movements of the portable electronic device 110 about the retail store. The content server 170 also may analyze demographic, socioeconomic, and educational history information on file about the user of the portable electronic device 110. The content server 170 may present promotional material, electronic coupons, and other incentives based on the analysis. While in or near the retail store, the ring tone and other sensory or interactive features of the portable electronic device 110 may be provided by the content server 170. Network services associated with the interface pack 174 loaded may associate a call tone associated with the business of the retailer to the portable electronic device 110, so that a caller originating a voice call to the portable electronic device 110 hears a call tone that is defined for the subject interface pack 174. As an example, the call tone may comprise a message that characterizes the retail store in a favorable light or provides a commercial message. Web widgets associated with the retailer may execute in the display of the portable electronic device 110 and may connect with internet web sites associated with the retailer. The web widgets may display streamed information or video material about merchandise for sale in the retail store or elsewhere. The portable electronic device 110 may be able to look up and view product specifications and/or reviews. Once the portable electronic device 110 is detected to exit the store and move beyond the predetermined distance from the retail store, the user applications 140, 142 downloaded from the content server 170 may unload and the default or previous user applications 140, 142 may be reloaded to the portable electronic device 110.

In a second example, the content provider or other entity operating the content server 180 may not be a retailer, and the downloading of an alternate user interface may not be based on location or movement of the portable electronic device 110. In the second example, the content server 180 may be associated with a provider of entertainment media, for example an entertainment company that may provide various news media, live sporting event broadcasting, and children's programming, each on both broadcast and cable television. The entertainment company also may produce full length motion pictures in a plurality of production studios. In the second example, instead of the portable electronic device 110 downloading the specialized user interface comprising the user applications 140, 142 upon entering a physical location, the portable electronic device 110 may download the interface pack 184, 186, 188 provided by the content server 180 and associated with the entertainment company upon the activation of an input on the portable electronic device 110. This may occur at the election of the user or may occur at a time of day or day of the week programmed into the interface application 120 by the user. The content server 180 may make available the interface packs 184, 186, 188, one of which may be selected for download and loading upon activation of an input. The interface pack 184 may provide user applications 140, 142 based on the delivery of international news. The interface pack 184 may load a user application 140 that is a web widget streaming continuous international news feeds to the portable electronic device 110. The interface pack 186 may have children's entertainment as its subject matter and provide games based on the entertainment company's cartoon characters. A policy associated with the portable electronic device 110 may prescribe that the interface pack 186 is loaded when an underage user is involved. The interface pack 188 may be targeted to users interested in sports programming and may provide web widgets with continuously updated scores of the day's sporting events. When one of the sets of user applications 140, 142 associated with one of the interface packs 184, 186, 188 downloaded from the content server 180 is loaded on the portable electronic device 110, the ring tone and/or call tone of the portable electronic device 110 may be based on one of the humorous animation characters in the entertainment company's programming. When the user of the portable electronic device 110 has consumed a sufficient quantity of entertainment or other media provided by the entertainment company, an input may be entered on the portable electronic device 110. The user interface comprising the user applications 140, 142 provided by the content server 180 may be unloaded and replaced by the user applications 140, 142 from the default user interface or some other user applications 140, 142 downloaded in the manners taught herein.

In a third example that may combine elements of the first example and the second example, the entertainment company, in addition to providing a plurality of types of entertainment and news media for various audiences, also may operate amusement parks and retail stores where products, for example dolls and games based on the characters in the entertainment company's programming, are sold. When the portable electronic device 110 becomes proximate to one of the entertainment company's amusement parks or retail stores, the content server 180 may detect this proximity and make available for downloading interface packs 184, 186, 188 containing user applications 140, 142 comprising a user interface based on the entertainment company's business. The process described above wherein an authorization token is passed from the content server 180 to telecommunications services provider used by the portable electronic device 110 requesting verification by the telecommunications services provider may be used. After the telecommunications services provider verifies that the portable electronic device 110 has previously authorized user interfaces from the entertainment company that operates the content server 180, the telecommunications services provider may pass the authorization token to the portable electronic device 110. In some cases, the telecommunications services provider may remotely turn on and/or enable a short range radio transceiver of the portable electronic device 110, for example a WiFi radio transceiver. The portable electronic device 110 then may pass the authorization token to the content server 180 that verifies the authorization token. The content server 180 then may direct the portable electronic device 110 to download an interface pack 184, uncompress it, and load the user applications 140, 142 contained therein. Because the downloading of the user interface from the entertainment company had been preauthorized by the user of the portable electronic device 110, the steps described herein may occur with little or no action required by the user upon coming within the predetermined coverage area of the content server 180.

The base transceiver station 190 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination.

While the present disclosure has discussed detection by the content server 170, 180 of the proximity of the portable electronic device 110, in an embodiment, detection may take place in other manners. For example, a wireless services provider that may be associated with at least one base transceiver station 190 may detect the presence of the portable electronic device 110. The location of the portable electronic device 110 may be detected by the identification of the global positioning system (GPS) coordinates of the portable electronic device 110 or by the radio frequency signal strength associated with the portable electronic device 110 and by using trilateration. The wireless services provider may work with the infrastructure of the content provider, for example the content server 170, 180 to obtain and pass authorization tokens, WiFi network names, and passwords. The wireless services provider that may be the same entity as the telecommunications services provider or may be associated with the telecommunications services provider, then may engage in the process described herein wherein the willingness of the user of the portable electronic device 110 to download the interface pack 174 from the content server 170 is determined. Once determined, the authorization tokens are passed, steps are taken to activate the WiFi transceiver of the portable electronic device 110, and the interface pack 174 is downloaded, uncompressed, and the user applications 140, 142 contained within are loaded on the portable electronic device 110.

The interface application 120 comprises an installation component 122 that interacts with the software installer 130 to load the user applications 140, 142 contained in the interface pack 162 received from the provider server 150 after the portable electronic device 110 is initially activated for service by the telecommunications service provider. The provider server 150 also may be accessed after the initial downloading of the interface pack 162 for access to a second or subsequent interface pack 162 to replace the user applications 140, 142 loaded from the initial interface pack 162. The installation component 122 also interacts similarly with the software installer 130 when any one of the interface packs 174, 176, 178, 184, 186, 188 is being downloaded from content servers 170, 180 associated with content providers other than the telecommunications service provider. The software installer 130 may be included in each interface pack 162, 174, 176, 178, 184, 186, 188. The software installer 130 remains loaded and ready to use on the portable electronic device 110 after it has been downloaded the first time. Each interface pack 162, 174, 176, 178, 184, 186, 188 also may include a style guide. Even though the user applications 140, 142 originating from the provider server 150 and content servers 170, 180 may be precertified and trusted and provided automated loading routines requiring little or no user action, the user applications 140, 142 still may be configured and selectively unloaded after their automated loading. The style guide may be used in configuring loaded user applications 140, 142. In an embodiment, the user interface comprising at least one user application 140, 142 as taught herein may be referred to as a mobile ego.

The interface application 120 also comprises a selection component 124 that is used to configure choices regarding the retailers and other entities from which the user of the portable electronic device 110 selects download interface packs 174, 176, 178, 184, 186, 188 comprising alternate user interfaces. The selection component 124 accepts and executes configuration instructions regarding the content servers 170, 180 that the portable electronic device 110 may access. The selection component 124 may execute instructions regarding content servers 170, 180 whose transmissions are to be blocked at either specific times or at all times or for specific users, in the case of underage users, for example. The selection component 124 may configure how requests from content servers 170, 180 are to be processed regarding the activation of a WiFi transceiver or similar functionality associated with the portable electronic device 110 that may be used to exchange transmissions and conduct business while the portable electronic device 110 is proximate the retail store or other venue associated with the content servers 170, 180. In an embodiment, the selection component 124 may be used to turn on the WiFi transceiver when messages are received from one or more designated content servers 170, 180 requesting activation of the WiFi transceiver after the verification process described above involving the telecommunications services provider and passage of authentication tokens completed. In an embodiment, the selection component 124 may instead provide an audible or other notification that a content server 170, 180 has sent a message requesting the activation of the WiFi transceiver and may provide the user of the portable electronic device 110 the option of accepting or declining the request.

The interface application 120 also comprises a transaction component 126 that promotes the portable electronic device 110 interacting with the content servers 170, 180 and other components during sessions wherein user applications 140, 142 associated with interface packs 174, 184 are in use on the portable electronic device 110. When the portable electronic device 110 is in the proximity of a retail store associated with one of the content servers 170, 180, the transaction component 126 may be used to transact business with the retail store, for example accessing an electronic wallet application to complete a point of sale transaction. The transaction component 126 also may receive and display electronic coupons or other items of value provided by the retailer. The transaction component 126 may be used to submit bids or other transaction communication when the content provider associated with the content server 170, 180 is an auction company The interface application 120 also comprises a restoration component 128 that reloads on the portable electronic device 110 the default or previous user interface comprising an earlier set of user applications 140, 142 that was temporarily unloaded while an interface pack 174, 176, 178, 184, 186, 188 was downloaded from a content server 170, 180 and loaded on the portable electronic device 110. When a first user interface is unloaded so it may be replaced by user applications 140, 142 comprising a second user interface, the user may wish to subsequently reload the first user interface. Instead of deleting and later fully reloading the first user interface, portions of the user applications 140, 142 comprising the first user interface may be cached, The portions that are cached may be stored locally on the portable electronic device 110 or may be stored in a remote device, When a set of user applications 140, 142 comprising the second user interface is unloaded because the portable electronic device 110 has moved out of the proximity of a retail store or because of user input or occurrence of other event, the restoration component 128 may reload the previous, default, or first user interface. This action may involve bringing the saved files from the first user interface out of cache, accessing current versions of the user applications 140, 142 that were unloaded when the second user interface was loaded, and combining the saved portions with the newly generated current versions of the files that were unloaded in a manner that the first user interface is reloaded but with refreshed versions of user applications 140, 142. When the first user interface was unloaded, template files used for rendering user applications 140, 142 and authorizations may have been cached. The restoration component 128 locates the cached files and downloads the current portions of the files that may not have been saved because they were associated with perishable content, for example. The restoration component 128 may initiate a session with the provider server 150, content servers 170, 180, or other component to access the desired files. The files may be provided in an interface pack 162, 174, 176, 178, 184, 186, 188 provided by the provider server 150 or the content servers 170, 180, respectively. When combining the cached files with the newly generated current versions of the previously unloaded files, the restoration component may follow specialized routines to overcome issues presented by files having different versions. The restoration component 128 determines the routines to follow to perform the combination of these files such that the desired current version of the first user interface may be restored to the portable electronic device 110.

Figure 2:
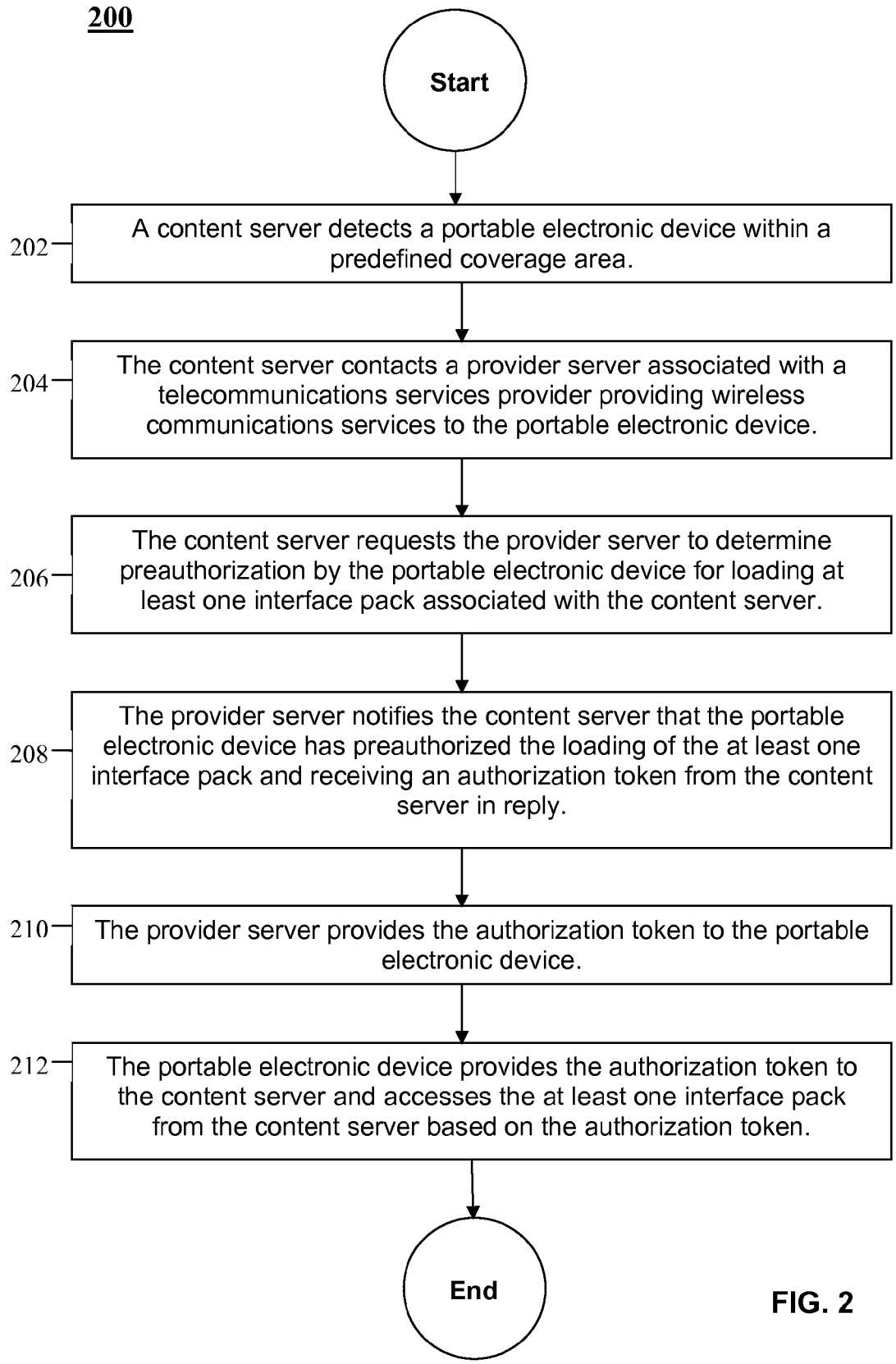
FIG. 2 is a flow chart illustrating a method according to an embodiment of the disclosure.

Turning now to FIG. 2, a processor-implemented method 200 is provided. Beginning at block 202, a content server detects a portable electronic device within a predefined coverage area. At block 204, the content server contacts a provider server associated with a telecommunications services provider providing wireless communications services to the portable electronic device.

At block 206, the content server requests the provider server to determine preauthorization by the portable electronic device for loading at least one interface pack associated with the content server. At block 208, the provider server notifies the content server that the portable electronic device has preauthorized the loading of the at least one interface pack and receiving an authorization token from the content server in reply.

At block 210, the provider server provides the authorization token to the portable electronic device. At block 212, the portable electronic device provides the authorization token to the content server and accesses the at least one interface pack from the content server based on the authorization token.

Figure 3:
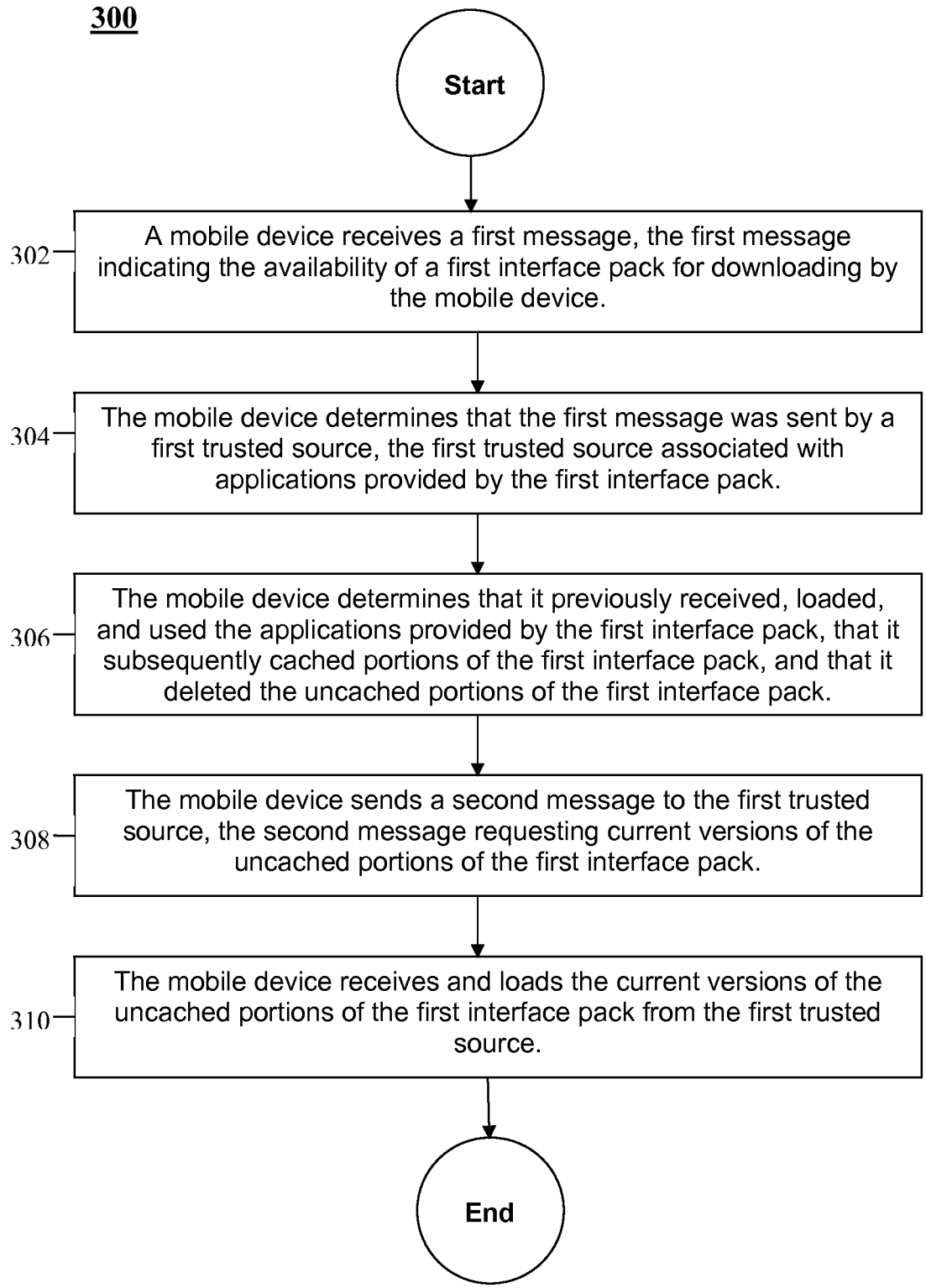
FIG. 3 is a flow chart illustrating a method according to an embodiment of the disclosure.

Turning now to FIG. 3, a processor-implemented method 300 is provided. Beginning at block 302, a mobile device receives a first message, the first message indicating the availability of a first interface pack for downloading by the mobile device. At block 304, the mobile device determines that the first message was sent by a first trusted source, the first trusted source associated with applications provided by the first interface pack.

At block 306, the mobile device determines that it previously received, loaded, and used the applications provided by the first interface pack, that it subsequently cached portions of the first interface pack, and that it deleted the uncached portions of the first interface pack. At block 308, the mobile device sends a second message to the first trusted source, the second message requesting current versions of the uncached portions of the first interface pack. At block 310, the mobile device receives and loads the current versions of the uncached portions of the first interface pack from the first trusted source.

Figure 4:
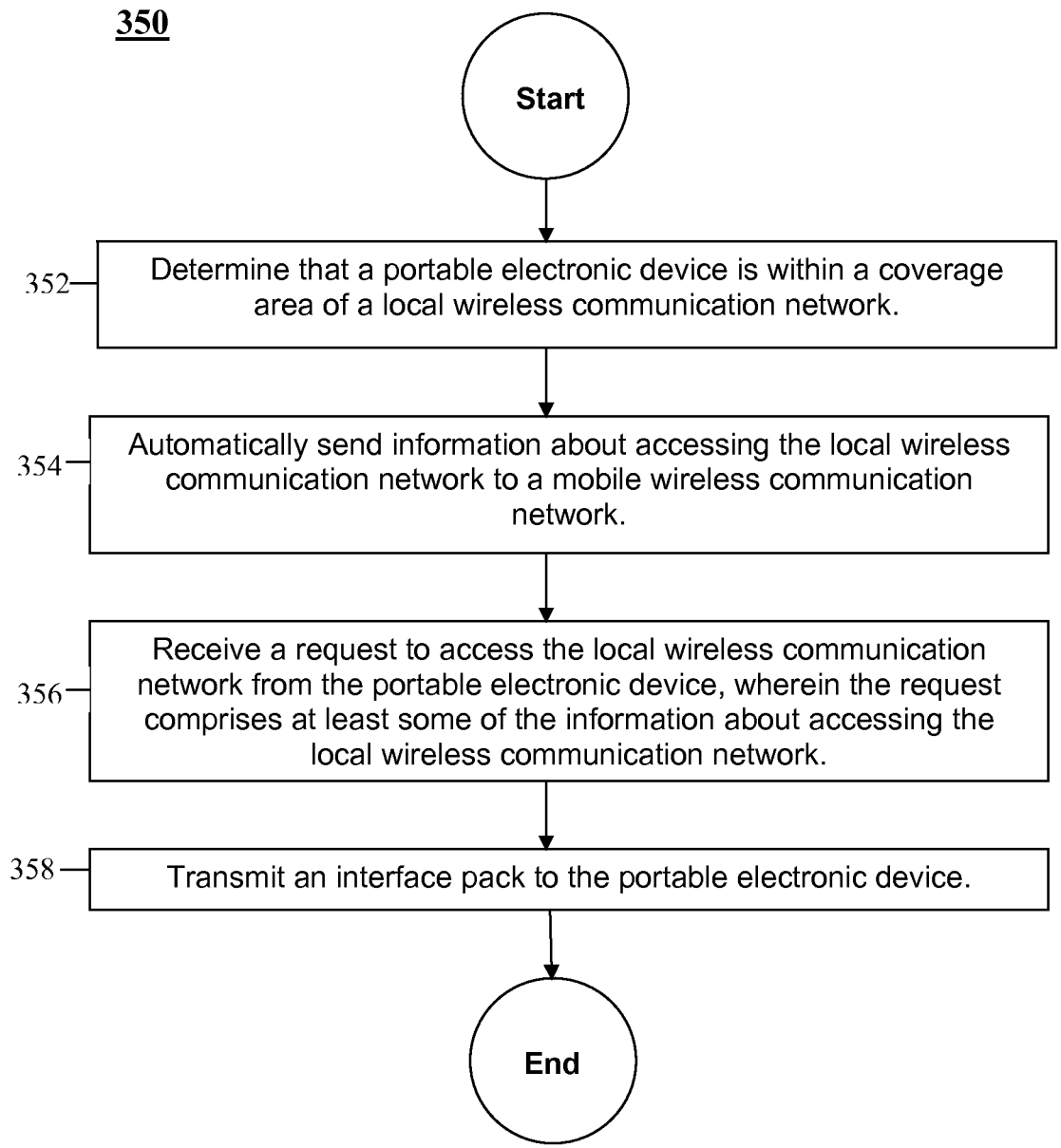
FIG. 4 is a flow chart illustrating a method according to an embodiment of the disclosure.

Turning now to FIG. 4, a method 350 is provided. Beginning at block 352, a content provider, telecommunications services provider, or other component determines that a portable electronic device is within a coverage area of a local wireless communication network. At block 354, the content provider or other component automatically sends information about accessing the local wireless communication network to a mobile wireless communication network.

At block 356, the content provider or other component receives a request to access the local wireless communication network from the portable electronic device, wherein the request comprises at least some of the information about accessing the local wireless communication network. At block 358, the content provider or other component transmits an interface pack to the portable electronic device.

Figure 5:
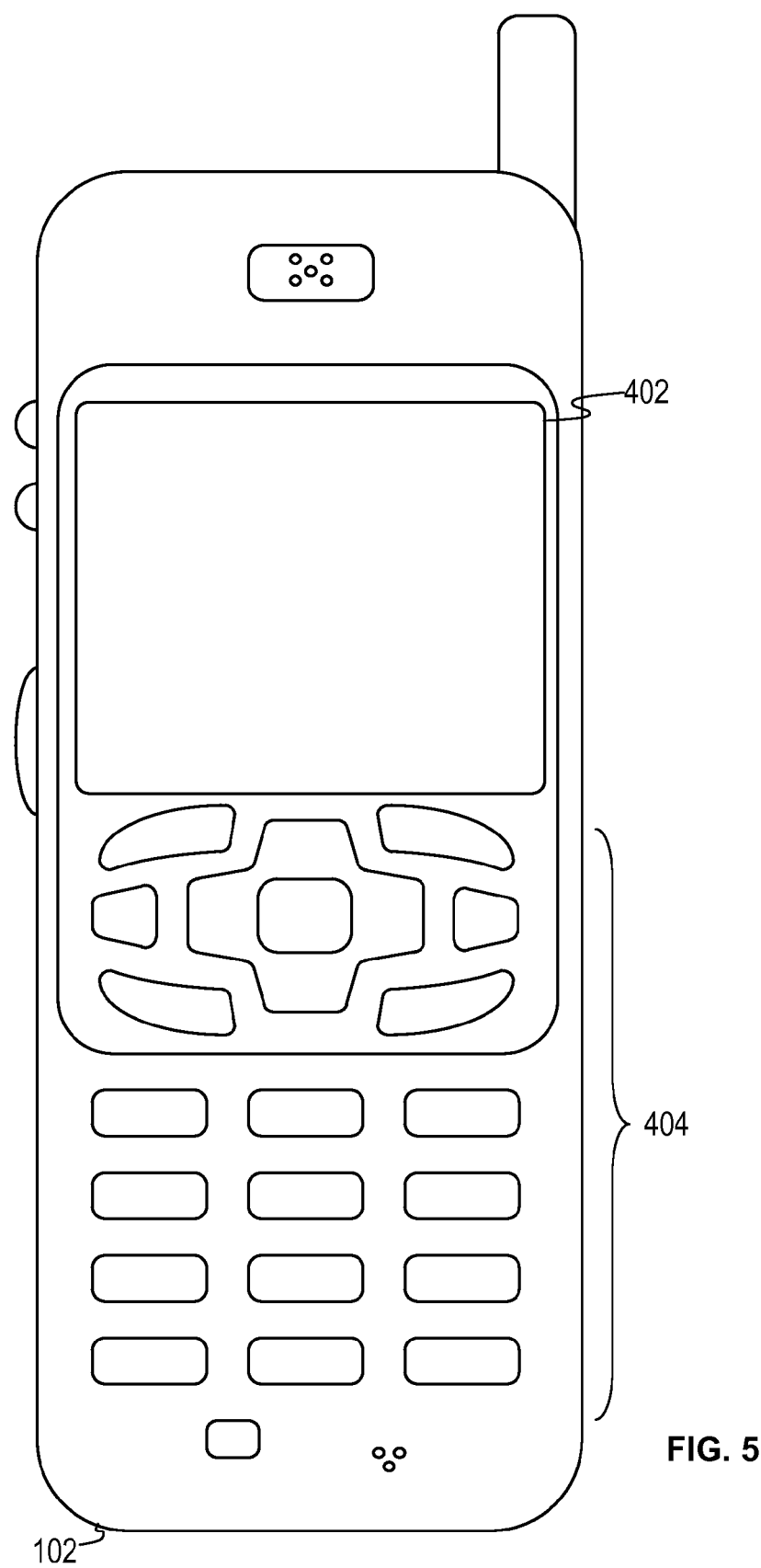
FIG. 5 is an illustration of a mobile device according to an embodiment of the disclosure.

FIG. 5 shows a mobile device 102. FIG. 5 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 6:
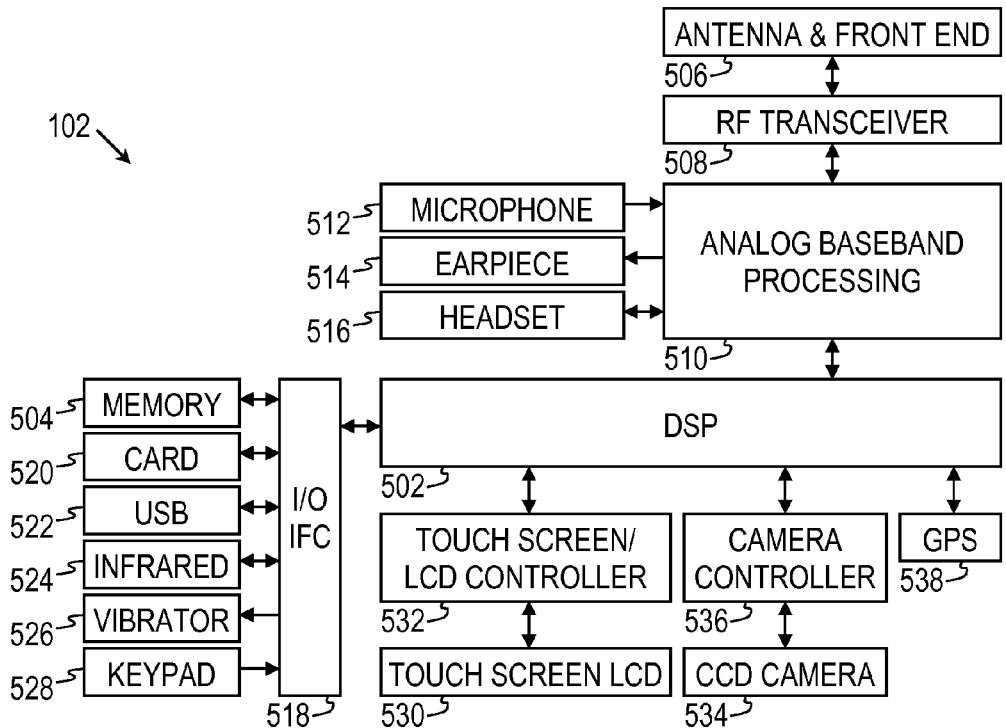
FIG. 6 is a block diagram of a mobile device according to an embodiment of the disclosure.

FIG. 6 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 7:
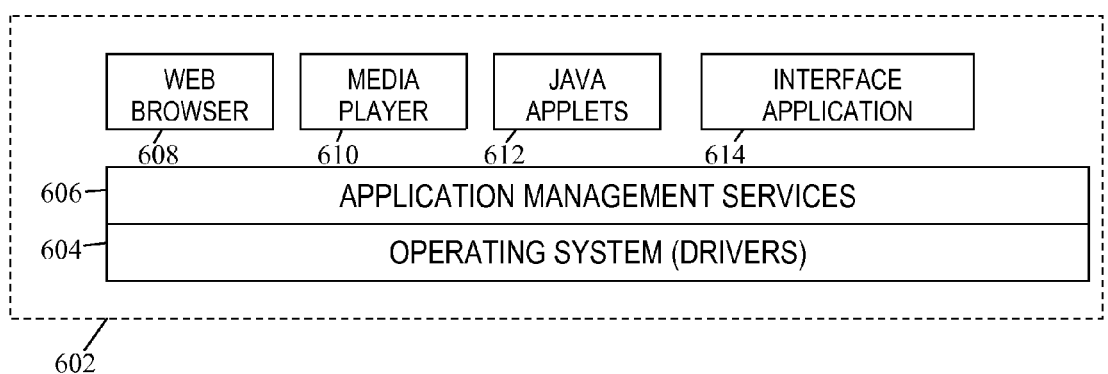
FIG. 7 is a block diagram of a software architecture for a mobile device according to an embodiment of the disclosure.

FIG. 7 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 7 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The interface application 614 may correspond to the interface application 120 provided by the system 100.

Figure 8:
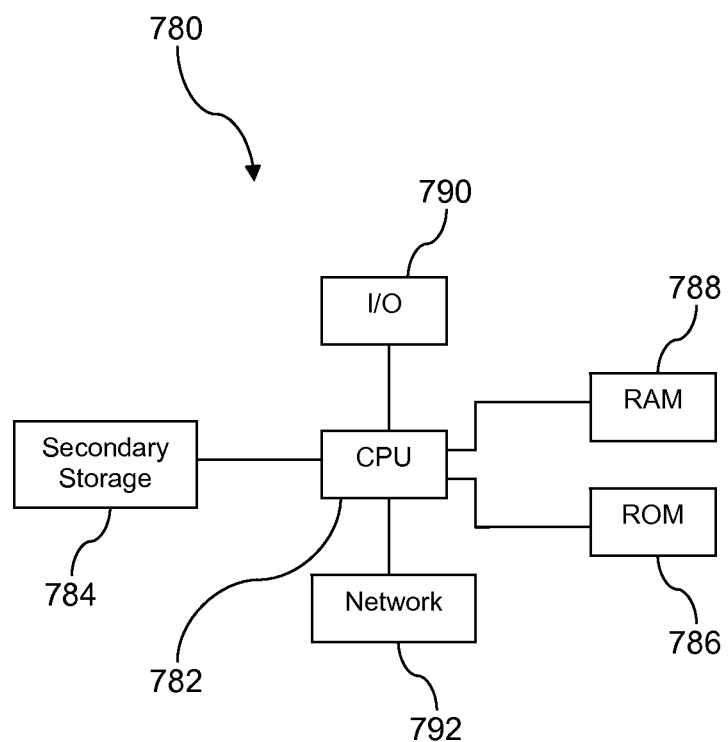
FIG. 8 illustrates an exemplary computer system suitable for implementing some aspects of the several embodiments of the disclosure.

FIG. 8 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
   a processor;
   a memory; and
   an interface application that, when executed on the portable electronic device,
   loads a default interface pack downloaded from a first software source associated with a telecommunications service provider, wherein the default interface pack comprises an automated loading routine and a plurality of default interface applications, wherein the plurality of default interface applications comprises at least three of a web widget, a tile, a really simple syndication (RSS) feed icon, a media player, a wallpaper, a ring tone, a link, and a network service,
   unloads and caches the plurality of default interface applications when the portable electronic device is detected to enter a physical venue,
   passes an authorization token received from the telecommunications service provider to a content provider for verification, wherein the authorization token is initially passed from the content provider to the telecommunications service provider when the portable electronic device is detected to enter the physical venue, and wherein the telecommunications service provider provides the authorization token to the portable electronic device in response to determining that the portable electronic device has previously authorized receiving one or more interface packs from the content provider,
   loads, in response to the verification of the authorization token, a venue-specific interface pack downloaded from a second software source associated with the content provider when the portable electronic device is detected to enter the physical venue, wherein the venue-specific interface pack comprises an automated loading routine and a plurality of venue-specific applications, wherein the plurality of venue-specific applications further comprises at least three of a web widget, a tile, a really simple syndication (RSS) feed icon, a media player, a wallpaper, a ring tone, a link, and a network service,
   unloads and one of caches or deletes the plurality of venue-specific applications, and
   reloads from cache the plurality of default interface applications on the portable electronic device.

2. The system of claim 1, wherein the plurality of default interface applications comprises the default user interface for the portable electronic device.

3. The system of claim 1, wherein the plurality of default interface applications is initially loaded when the portable electronic device is activated for at least one of voice and data wireless services.

4. The system of claim 1, wherein the plurality of default interface applications is unloaded and cached and the plurality of venue-specific interface applications is loaded upon activation of an input on the portable electronic device.

5. The system of claim 4, wherein the plurality of venue-specific interface applications is one of unloaded and one of cached and deleted and the plurality of default interface applications is reloaded from cache upon activation of an input on the portable electronic device.

6. The system of claim 1, wherein the plurality of venue-specific interface applications and the plurality of default interface applications are at least one of cached locally on the portable electronic device and cached in a remote storage device.

7. A processor-implemented method for loading, unloading, caching, and reloading packaged bundles of applications, content, themes, and/or network applications that comprise at least a portion of a user interface for a mobile device comprising:

loading, by a mobile device, a default interface pack downloaded from a telecommunications service provider, wherein the default interface pack comprises an automated loading routine and a plurality of default interface applications;

unloading and caching, by the mobile device, the plurality of default interface applications when the mobile device is detected to enter a physical venue, passing, by the mobile device, an authorization token received from the telecommunications service provider to a content provider for verification, wherein the authorization token is initially passed from the content provider to the telecommunications service provider when the mobile device is detected to enter the physical venue, and wherein the telecommunications service provider provides the authorization token to the mobile device in response to determining that the mobile device has previously authorized receiving one or more interface packs from the content provider;

receiving, by the mobile device, a first message in response to the verification of the authorization token, the first message indicating the availability of a venue-specific interface pack for downloading by the mobile device, wherein the venue-specific interface pack comprises an automated loading routine and a plurality of venue-specific applications, wherein the plurality of venue-specific applications comprises at least three of a web widget, a tile, a really simple syndication (RSS) feed icon, a media player, a wallpaper, a ring tone, a link, and a network service;

determining, by the mobile device, that the first message was sent by a first trusted source, the first trusted source associated with the plurality of venue-specific applications provided by the venue-specific interface pack;

determining, by the mobile device, that it previously received, loaded, and used the plurality of venue-specific applications provided by the venue-specific interface pack, that it subsequently cached portions of the venue-specific interface pack, and that it deleted the uncached portions of the venue-specific interface pack in response to detecting that the mobile device has exited the physical venue;

sending, by the mobile device, a second message to the first trusted source, the second message requesting current versions of the uncached portions of the venue-specific interface pack;

receiving, by the mobile device, and installing the current versions of the uncached portions of the venue-specific interface pack from the first trusted source;

unloading and one of caching or deleting, by the mobile device, the plurality of venue-specific applications; and reloading, by the mobile device, from cache the plurality of default interface applications on the mobile device.

8. The method of claim 7, wherein the mobile device receives the first message further based on receiving a user input.

9. The method of claim 7, wherein the mobile device uses WiFi technology to receive the first message and receive the current versions of the uncached portions of the venue-specific interface pack.

10. The method of claim 7, wherein the plurality of venue-specific applications provided by the venue-specific interface pack comprises a user interface for the mobile device.

11. The method of claim 7, wherein the cached portions of the venue-specific interface pack comprise previously determined authorizations for using the plurality of venue-specific applications provided by the venue-specific interface pack and comprise template files used for rendering the plurality of venue-specific applications provided by the venue-specific interface pack.

12. The method of claim 7, wherein the deleted uncached portion of the venue-specific interface pack and the current version of the uncached portions of the venue-specific interface pack comprise periodically changing information.

13. The method of claim 7, further comprising executing, by the mobile device, the current and full contents of the venue-specific interface pack by combining the current version of the uncached portion of the venue-specific interface pack with cached portions of the venue-specific interface pack.

14. The system of claim 1, wherein the venue-specific interface pack is one of unloaded and one of cached and deleted and the default interface pack is reloaded from cache when the portable electronic device is detected to exit the physical venue.

* * * * *